United States Patent
Houseman et al.

(10) Patent No.: US 6,676,180 B1
(45) Date of Patent: Jan. 13, 2004

(54) ARTICULATION CONTROLLING APPARATUS

(75) Inventors: Terrance Lane Houseman, Jetmore, KS (US); Merrill Lee Cauble, Larned, KS (US); Lonnie Ray Martin, II, Halstead, KS (US); Michael Lee McCoy, Wichita, KS (US)

(73) Assignee: Kritter Gitter, Inc., Jetmore, KS (US)

( * ) Notice: Subject to any disclaimer, the term of this patent is extended or adjusted under 35 U.S.C. 154(b) by 0 days.

(21) Appl. No.: 10/194,651

(22) Filed: Jul. 12, 2002

(51) Int. Cl.[7] .............................................. B60R 19/52
(52) U.S. Cl. ..................... 293/115; 293/118; 293/155
(58) Field of Search ................... 293/38, 39, 112, 293/114, 115, 118, 129, 131, 132, 133, 138, 139, 140, 142, 143, 144, 145, 146, 147, 148, 152, 153, 154, 155; 52/633; 403/24, 79, 53, 56, 83, 85, 86, 119, 167, 220

(56) References Cited

U.S. PATENT DOCUMENTS

| | | | |
|---|---|---|---|
| 1,587,517 A | * | 6/1926 | Goetz ........................ 293/140 |
| 1,656,026 A | * | 1/1928 | Walter ....................... 293/135 |
| 3,282,368 A | * | 11/1966 | Pittera ....................... 293/115 |
| 3,287,027 A | | 11/1966 | Schuckman |
| 3,749,436 A | | 7/1973 | Hitchcock |
| 4,099,760 A | | 7/1978 | Mascotte et al. |
| 4,125,214 A | * | 11/1978 | Penn ......................... 293/117 |
| 4,469,360 A | * | 9/1984 | Drury ........................ 293/155 |
| 4,570,367 A | * | 2/1986 | Oya .......................... 293/138 |
| 4,657,294 A | | 4/1987 | Rumpp |
| 5,067,760 A | | 11/1991 | Moore et al. |
| 5,636,885 A | | 6/1997 | Hummel |
| 5,683,128 A | | 11/1997 | Heyns |
| 6,447,032 B1 | * | 9/2002 | Howell, Sr. ................. 293/115 |

FOREIGN PATENT DOCUMENTS

| | | |
|---|---|---|
| CA | 2159968 | 2/2002 |
| DE | 3518899 A1 | 11/1986 |
| JP | 06305381 A | 1/1994 |

* cited by examiner

*Primary Examiner*—Stephen T. Gordon
*Assistant Examiner*—Jason Morrow
(74) *Attorney, Agent, or Firm*—Kenneth H. Jack; Davis & Jack, LLC

(57) ABSTRACT

An apparatus for controlling articulating motion of an article such as a truck grille guard, the apparatus having a clevis having left and right arms; an article support axle extending laterally through a lower end of the clevis; a second laterally extending axle spanning between the arms of the clevis at the clevis's upper end; an upper guy having an upper end pivotally mounted upon the second axle, a lower guy having an upper end pivotally mounted upon a lower end of the upper guy, and an article supporting hinge sleeve fixedly mounted upon a lower end of the lower guy, the upper and lower guys being alternately flexible and extendable between an upwardly articulated article position and a downwardly articulated article position.

9 Claims, 3 Drawing Sheets

ARTICULATION CONTROLLING APPARATUS

CROSS REFERENCE TO RELATED APPLICATIONS

The applicants herein have contemporaneously filed related applications entitled Impact Absorbing Truck Grille Guard and Truck Grille Guard Mounting Bracket.

FIELD OF THE INVENTION

This invention relates to bracket and pivot mechanisms adapted for mounting of articles, such as truck grille guards, and for providing for and controlling articulating or pivoting motion of such articles.

BACKGROUND OF THE INVENTION

Where an article such as a truck grille guard must be securely mounted, where the article must be capable of pivoting between an upwardly articulated position and a downwardly articulated position, where the article must be lockable in the upwardly articulated position, and where downwardly articulating motion of the article must be stopped at a desired angle, several separate structures and mechanisms known for facilitating such functions are commonly provided. Providing separate structures for separately performing such functions results in undue mechanical complexity, a lack of space economy, and a lack of cost economy.

The instant inventive articulation controlling apparatus overcomes said defects and deficiencies by providing a single unitary mechanism capable of performing all of said functions.

BRIEF SUMMARY OF THE INVENTION

The present inventive articulation or pivot controlling apparatus preferably comprises a forwardly opening and vertically elongated clevis having forwardly extending left and right arms. The preferred vertical extension of the clevis allows the clevis to comprise a first lower pivot means and a second upper pivot means, each means preferably spanning between the left and right arms of the clevis. Suitably, though less desirably, the clevis may comprise a series of vertically aligned lower and upper devises which are rigidly interlinked by other structure.

The first lower pivot means preferably comprises a clevis pin or hinge pin extending laterally through laterally opposed eyes extending through the lower ends of the left and right arms of the clevis. Preferably, such clevis pin is adapted for supporting an article such as a truck grille guard. Suitably, though less desirably, the first pivot means may comprise separate left and right axles or pivot pins supported separately by the left and right arms of the clevis.

A second upper pivot means configured similarly with any suitable first pivot means is necessarily operatively connected to the upper ends of the left and right arms of the clevis. Preferably, the second pivot means comprises a clevis pin or hinge pin extending laterally between the left and right arms of the clevis, and extending through a hinge sleeve, forming a pin, eye, and clevis joint.

A guy, preferably comprising upper and lower guys attached in series, is operatively connected to the second pivot means for pivoting and articulating motion with respect to the clevis. Preferably, the upper guy comprises a flat plate fitted for, upon pivoting retracting toward the clevis, nesting receipt within the clevis. The upper end of the flat plate is preferably welded to the preferred hinge sleeve of the second pivot means.

Third pivot means operatively connected to lower end of the upper guy are necessarily provided, said means preferably comprising an interlocking pin and sleeve joint. Preferably, the lower guy comprises a "C" channel beam and is similarly fitted for nesting receipt within the clevis. An upper end of the lower guy is necessarily operatively connected to the third pivot means for pivoting motion of the lower guy with respect to the upper guy. Preferably, the third pivot means accommodates flexion of the upper and lower guys to approximately zero degrees with respect to each other, and alternately facilitates extension to 180 degrees with respect to each other.

A fourth pivot means is necessarily operatively connected to the lower end of the upper guy, said means preferably being adapted for supporting the same article supported by the first pivot means.

Preferably, means for selectively and alternately resisting and permitting extension of the upper and lower guys is provided, said means preferably alternately resisting and permitting movement of the guys between their zero degree upwardly articulated article position and their 180 degree downwardly articulated article position, the resistance provided by such means effectively locking the mechanism in its up position. Preferably, such means comprises a bolt receiving aperture extending through the lower guy and a spirally threaded nut or lug extending forwardly from the base of the clevis. Upon retraction or flexion of the upper and lower guys, said aperture aligns with said spirally threaded lug or nut, allowing a spirally threaded bolt or a separate spirally threaded nut to fixedly position the upper and lower guys in their zero degree upwardly articulated article position.

Suitably, though less desirably, the means for selectively and alternately resisting and permitting extension of the upper and lower guys may comprise laterally opposed sheer pin receiving eyes extending through the upper ends of the left and right arms of the clevis in combination with a removable sheer pin extending through said eyes, such sheer pin capturing the upper and lower guys while they occupy their fully flexed position and nest within the clevis.

Preferably, the base of the clevis extends leftwardly and rightwardly from rearward ends of the left and right arms of the clevis, such base extensions forming a mounting plate for fixed attachment of the apparatus to structures such as a truck bumper.

The instant inventive articulation controlling apparatus may be utilized multiply in combination with other renditions of the apparatus for supporting and providing stability to large structures to be articulated.

Accordingly, it is an object of the present invention to provide an apparatus for secure mounting support of articles such as truck grille guards, said apparatus being capable of facilitating articulating or pivoting motion of such article, such apparatus being further capable of locking such article in an upwardly articulated position, and such apparatus being further capable of stopping downwardly articulating or pivoting motion of such article.

Other and further objects, benefits, and advantages of the present invention will become known to those skilled in the art upon review of the Detailed Description which follows, and upon review of the appended drawings.

BRIEF DESCRIPTION OF THE DRAWINGS

FIG. 1 is an isometric view of the instant inventive articulation controlling apparatus.

DETAILED DESCRIPTION OF A PREFERRED EMBODIMENT

Figure 1:
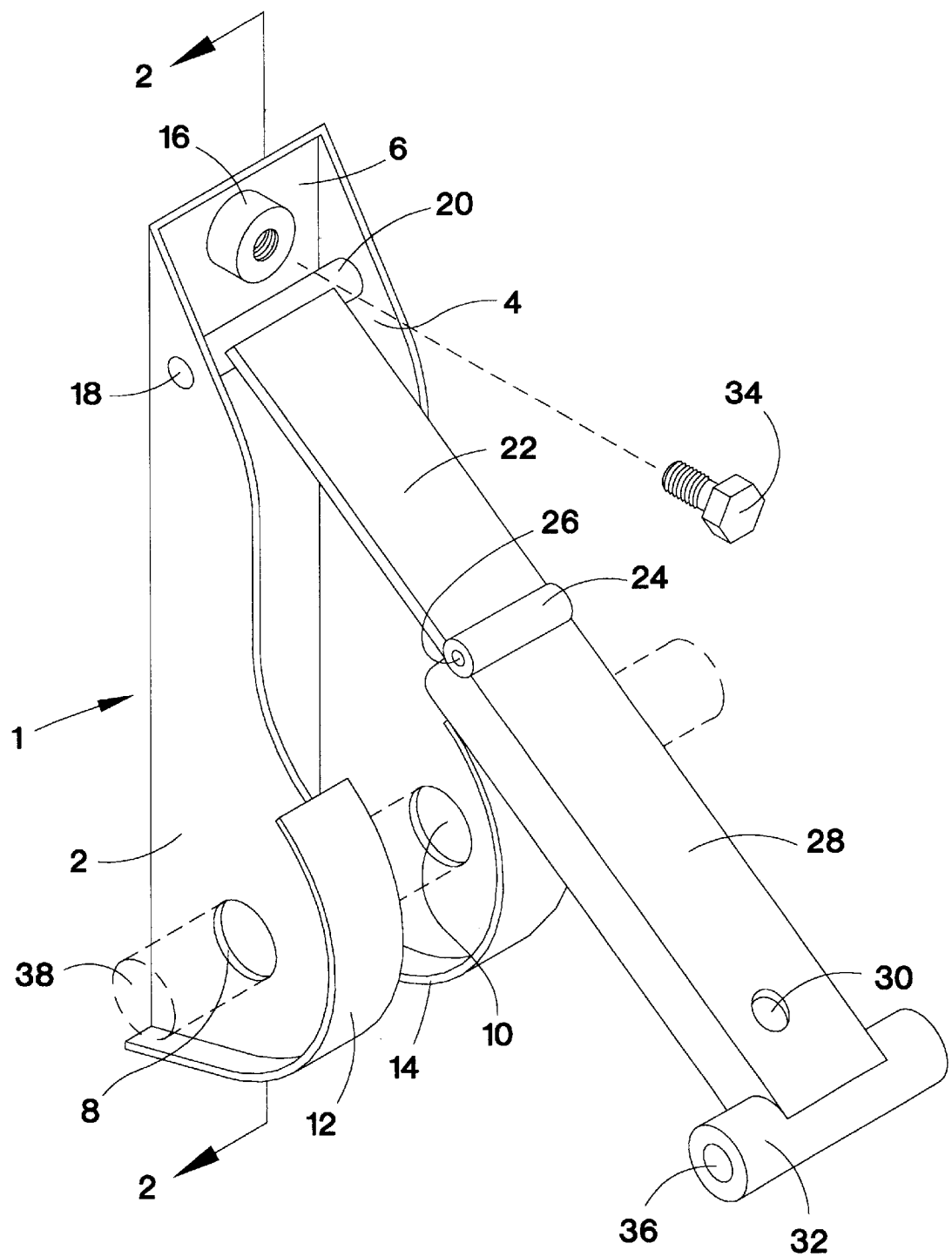
Figure 3:
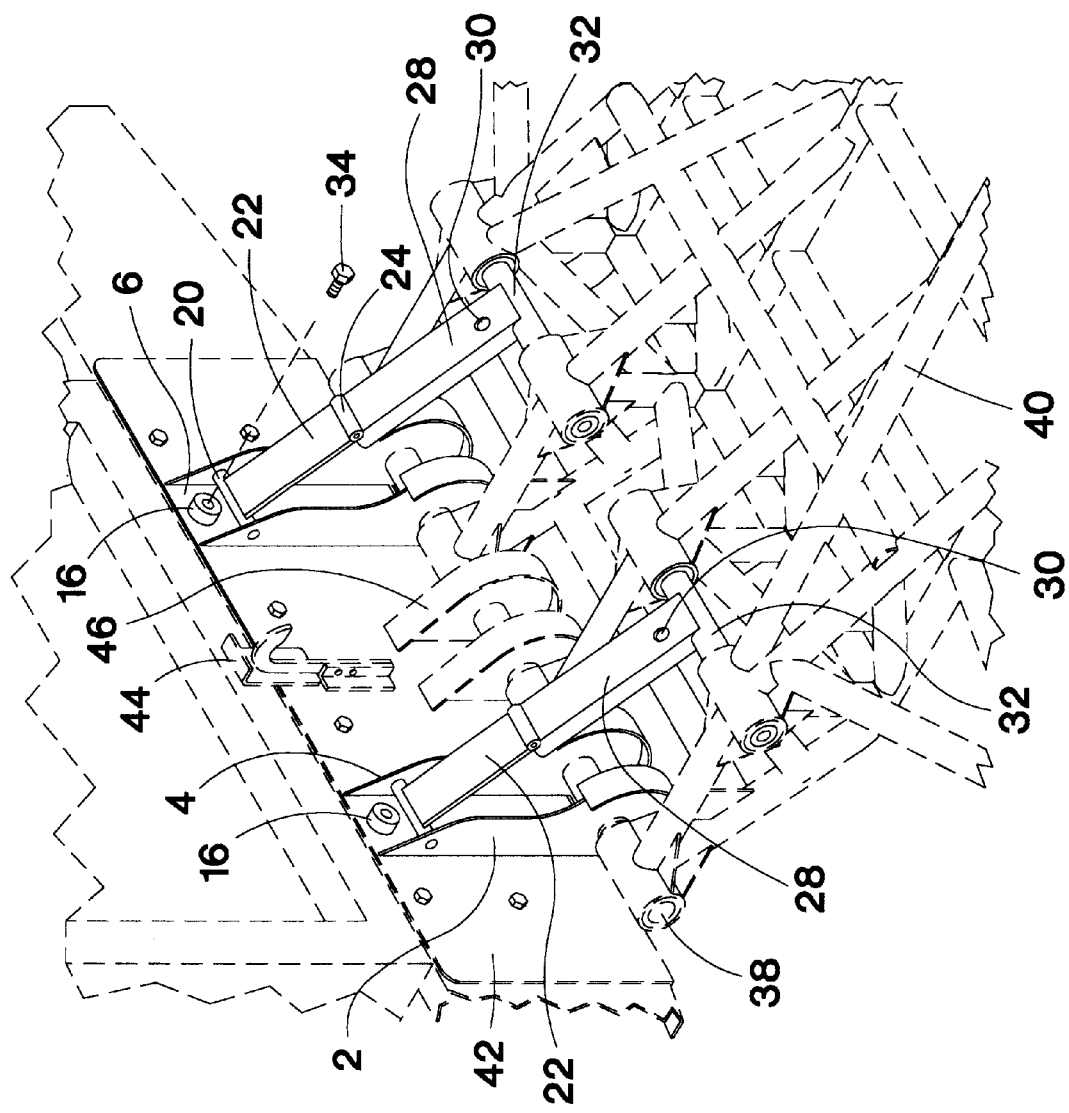
FIG. 3 depicts usage of the inventive articulation controlling apparatus for support of a pivotable truck grille guard.

Referring now to the drawings, and in particular to FIG. 1, the instant inventive articulation controlling apparatus is referred to generally by Reference Arrow 1. A primary structural component of the apparatus comprises a vertically elongated and forwardly opening clevis having forwardly extending right and left arms 2 and 4, a base 6 spanning between rearward ends of said arms, laterally opposed right and left eyes 8 and 10 respectively extending through lower ends of the right and left arms 2 and 4, and having reinforcing "T" flanges 12 and 14 respectively fixed welded to peripheral surfaces of right and left arms 2 and 4. Eyes 8 and 10 in combination with axle or clevis pin 38 comprise a first pivot means. Referring simultaneously to FIGS. 1 and 3, the base 6 preferably further extends leftward and rightwardly and from rearward ends of the right and left arms 4 forming, for example, a truck bumper mounting plate 42.

Referring again to FIG. 1, a second pivot means, preferably comprising hinge sleeve 20 and hinge or clevis pins 18, pivotally mounts upper guy 22 upon the upper ends of arms 2 and 4. A third pivot means is necessarily operatively connected to the lower end of upper guy 22 and to the upper end of a lower guy 28, said third pivot means preferably comprising a hinge pin 26 extending through interlocking eyes 24.

Referring further to FIG. 1, a fourth pivot means, preferably comprising an axle or hinge pin 32 or a hollow bore 36 for receipt of an axle or hinge pin, is operatively connected to the lower end of lower guy 28.

Figure 2:
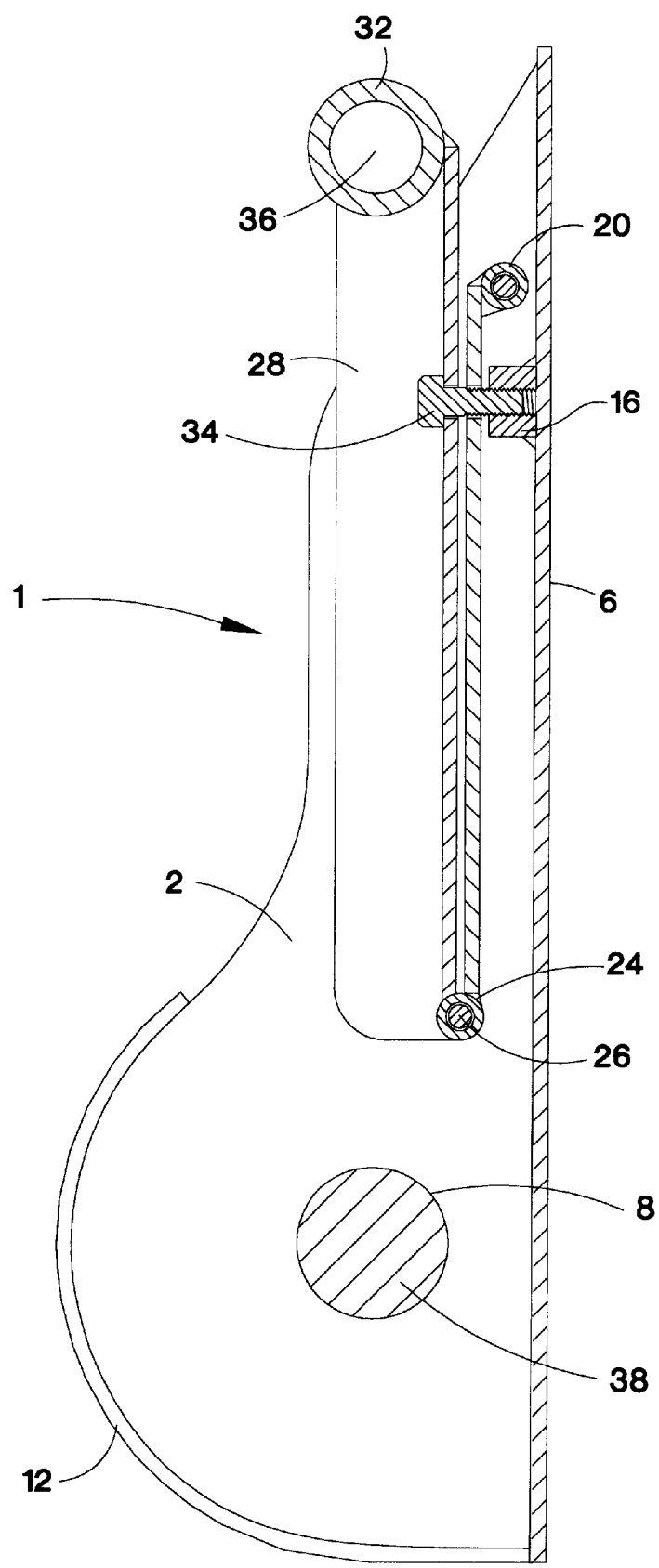
FIG. 2 is a sectional view as indicated in FIG. 1.

Referring further to FIG. 1, a spirally threaded nut 16 is preferably fixedly welded to the base 6, and a bolt receiving aperture 30 preferably extends through the web section of the preferred "C" channel beam configuration of lower guy 28. Upon full flexion of upper guy 22 and lower guy 28, and upon counter-clockwise rotation of said guys about pin 18, aperture 30 aligns with nut 16 and guys 22 and 28 pivotally retract to nest between arms 2 and 4. Upon such positioning, bolt 34 may be extended through aperture 30 and may be threadedly mounted within nut 16, securing guys 22 and 28 in such flexed and retracted position, as depicted in FIG. 2.

Referring to FIG. 3, in operation of the instant inventive articulation controlling apparatus, an article to be mounted and pivotingly articulated, for example, truck grille guard 40, is hingedly mounted upon hinge pin or axle 38, such hinge pin extending laterally through paired apparatuses as depicted in FIG. 1 and through an additionally supporting pin and clevis joint 46. Upon counter-clockwise upwardly retracting motion of grille guard 40, lower guys 28 rotate counter-clockwise while upper guys 22 rotate clockwise, causing bolt receiving apertures 30 to align with spirally threaded nuts 16. Upon full flexion of guys 22 and 28, a preferred manual latch 44 engages a cross member of grille guard 40, holding the grille guard in its upwardly articulated position. While the grille guard is held in such position, helically threaded bolts 34 are extended rearwardly through apertures 30 for threaded engagements with spirally threaded nuts 16, locking the grille guard 40 in its upwardly articulated position. Reversal of steps outlined above lowers the grille guard 40 for forward engine cowl pivoting and truck engine access.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. An apparatus for controlling articulating motion of an article, the apparatus comprising:

(a) a clevis having forwardly extending left and right arms, each arm having upper and lower ends and forward and rearward ends;

(b) first pivot means adapted for article support and operatively connected to the lower ends of said arms;

(c) second pivot means operatively connected to the upper ends of said arms;

(d) an upper guy having upper and lower ends, the upper end being operatively connected to the second pivot means;

(e) third pivot means operatively connected to the lower end of the upper guy;

(f) a lower guy having upper and lower ends, the upper end being operatively connected to the third pivot means; and (g) fourth pivot means operatively connected to the lower end of the lower guy and adapted for article support;

the upper and lower guys being alternately flexible and extendable between an upwardly articulated article position and a downwardly articulated article position.

2. The apparatus of claim 1 further comprising means for selectively and alternately resisting and permitting extension of the upper and lower guys, said means alternately resisting and permitting movement of said guys between their upwardly and downwardly articulated article positions.

3. The apparatus of claim 2 wherein each means among the first, second, third, and fourth pivot means comprises a hinge component selected from the group consisting of clevis pins, hinge pins, axles, sleeves and eyes.

4. The apparatus of claim 3 wherein the means for alternately and selectively resisting and permitting extension comprises a bolt receiving aperture extending through the lower guy.

5. The apparatus of claim 4 wherein the clevis comprises a base spanning between the rearward ends of the left and right arms, and wherein the means for selectively and alternately permitting and resisting extension further comprises a helically threaded lug or nut fixedly attached to the base, said lug or nut aligning with the bolt receiving aperture upon flexion of the upper and lower guys.

6. The apparatus of claim 4 wherein the upper guy comprises a flat plate fitted for nesting retraction into the clevis upon flexion of the upper and lower guys.

7. The apparatus of claim 6 wherein the lower guy comprises a "C" channel beam fitted for nesting retraction into the clevis upon flexion of the upper and lower guys.

8. The apparatus of claim 5 wherein the base further extends leftwardly and rightwardly from the rearward ends of the forwardly extending left and right arms of the clevis, the base comprising a truck bumper mounting plate.

9. The apparatus of claim 8 further comprising left and right "T" flanges respectively fixedly attached to the forward ends of the left and right arms of the clevis.

* * * * *